United States Patent [19]

Le Touche

[11] Patent Number: 4,482,111
[45] Date of Patent: Nov. 13, 1984

[54] THERMAL PROTECTION OR DISSIPATION SCREEN

[75] Inventor: Roger Le Touche, Ecquevilly, France

[73] Assignee: Societe Nationale Industrielle Aerospatiale, Paris, France

[21] Appl. No.: 405,653

[22] Filed: Aug. 5, 1982

[30] Foreign Application Priority Data

Aug. 26, 1981 [FR] France ................ 81 16303

[51] Int. Cl.$^3$ .................. B64C 1/38; B64G 1/58; F16L 59/00
[52] U.S. Cl. .................. 244/117 A; 244/158 A; 428/448; 428/921
[58] Field of Search .......... 244/117 A, 158 A, 158 R; 62/114, 239, 467 R; 428/920, 921; 252/67; 165/114.12, DIG. 4, DIG. 14; 428/71, 316.6, 446, 448

[56] References Cited

U.S. PATENT DOCUMENTS

| | | |
|---|---|---|
| 2,997,955 | 8/1961 | Wade . |
| 3,014,353 | 12/1961 | Scully et al. .......... 244/117 A |
| 3,067,594 | 12/1962 | Bland et al. .......... 244/117 A |
| 3,082,611 | 3/1963 | Alvis et al. .......... 244/117 A |
| 3,090,212 | 5/1963 | Anderson et al. .......... 244/117 A |
| 3,397,168 | 8/1968 | Kramer . |

FOREIGN PATENT DOCUMENTS 2061509 6/1971 France .

Primary Examiner—Trygve M. Blix
Assistant Examiner—Rodney Corl
Attorney, Agent, or Firm—Karl W. Flocks; Sheridan Neimark

[57] ABSTRACT

A thermal dissipation screen includes a hot wall and a cool wall and between the hot wall and the cool wall, a supple material of the layer, mat, fiber network type, used as a support or reinforcement for a pulverulent material capable of absorbing and retaining a liquid to produce a paste or a gel of a high thixotropic efficiency, such material constituting a hydrator-overheater element in the presence of the liquid evolving from the hydrating function to the overheating function, depending on the development of the thermal aggression.

11 Claims, 1 Drawing Figure

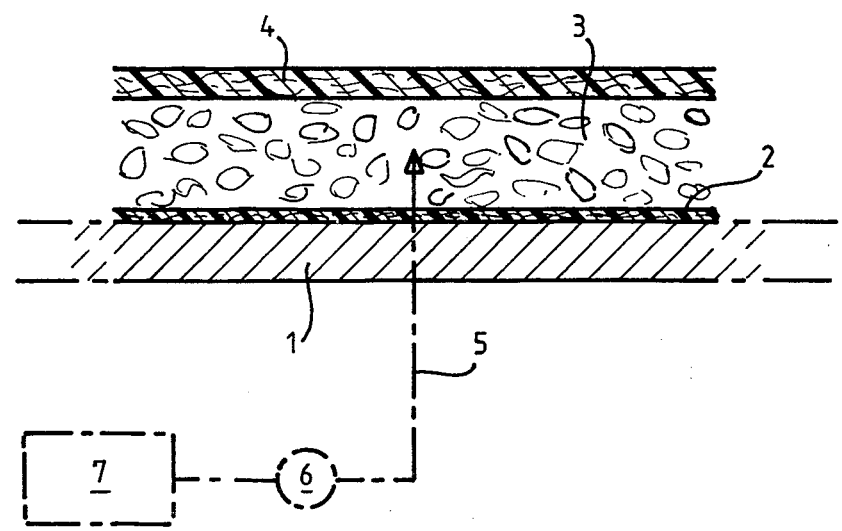

THERMAL PROTECTION OR DISSIPATION SCREEN

The present invention relates to a thermal protection or dissipation screen, more particularly, a screen for protection of those parts which should resist for relatively long time periods to thermal fluxes of any intensity which may reach a very high degree (this is the case with a fire or a very great thermal phenomenon that may lead to temperatures of over 2,000° C.).

This type of phenomenon occurs, for example, when fire is the cause for destruction of an airplane. However, in order to save the flight data record boxes, these must be efficiently shielded, as recovery of those boxes after the disaster is significant for being able to trace its origin.

Moreover, in many other cases, it may also be useful to protect for a relatively long time any part from an intense thermal flux. This can occur, for example, with the cones fitting an airspace vehicle during the phase of reentry into the atmosphere, or else, with gates or other fireproof bulkheads located close to a thermal source which may spontaneously become intense.

Various means of protection against high thermal flux are known. Among them, there will be cited those having an efficiency which does not depend on the intrinsic insulating properties of the composing materials. However, in certain applications, the quantities, the volumes or the thicknesses which are to be provided are so high or prohibitive that one may hesitate to have recourse to them. But should these factors not make one shrink back because of the necessity required anyhow by the circumstances, such means are very often inoperative as well in certain cases to keep parts to be protected at a constant sufficiently low temperature for a sufficiently long time period.

However, to reach the intended purpose, namely keeping the parts to be protected, for example, at a maximum temperature of 100° C. whereas the surrounding temperature might reach 1100° C. or 2000° C., or more, a thermal dissipation screen has already been proposed, having the supplementary advantage of reducing at least by half the thickness of the protective screen as compared to a screen consisting of a conventional insulating material. This screen which is the subject-matter of the French Pat. No. 6905203 of Feb. 27, 1969, published under No. 2 061 509, is substantially characterized in that it comprises between the hot wall and the cool wall a stratified hydrating element in contact with the cool wall, a stratified overheating element between the hydrating element and the hot wall, a porous stratified refractory element between the overheating element and the hot wall, the latter being formed with orifices therein to permit the saturated vapour produced in the hydrator during the functioning of the screen and overheated during its passage through the overheater to escape outside the hot wall.

It is known actually that in the complete vaporization process with overheating, such as resulting from Mollier's diagram (well known to the man of the art), the overheating of the vapour produces for a definite protection temperature an increase of enthalpy which is given by the difference in the ordinates between the intersection of the isobaric lines with the saturation line, and their intersection with the isothermal lines.

However, with a screen such as mentioned above, an efficient thermal protection can be realized according to which the lowest temperature does not exceed the vaporization temperature of the liquid included in the hydrator for the whole duration of such vaporization, namely for example 100° C. for water at the normal atmospheric pressure of 1 bar, and for a duration directly proportional to the quantity of water included in said hydrator.

It can then be immediately noted that although such screen has definite advantages over the earlier screens, and although the thickness of the screen which is the object of the above-mentioned patent is clearly reduced for the desired given degree of protection, the fact remains that it requires a bulky space which is not always available, especially when members or parts should be protected, which themselves are necessarily and obligatorily confined in a reduced volume, and no substantiall complementary external or peripheral bulk may be admitted or tolerated. However, protection thereof being indispensable, and since the screen of the earlier patent is not suitable for reasons of dimensions and for reasons, of relative rigidity of structure, a screen which is both of minimum bulk and supple is needed.

Moreover, said screen of the earlier patent raises difficulties when the temperature to which the element or organ to be protected is normally submitted is higher than the vaporization temperature of the liquid included in the hydrator (higher than 100° C., in the case of water). As a matter of fact, at such normal temperature of use, the quantity of liquid included in such hydrator diminishes and cannot normally be recovered unless means are provided as described in said patent for recycling the overheated vapour in the hydrator after condensation thereof. However, such means is a solution which is not necessarily satisfactory in all cases. Therefore, in case of fire there would be the great risk that the quantity of liquid in the hydrator which has a primary role and function for the efficiency of the protection, would be insufficient. Consequently, the man of the art must be able to provide and use a hydrator having a sufficient liquid charge at any temperature.

Finally, the refractory elements belonging to the constitution of the screen of said patent have a poor response to very high temperatures (equal to, or higher than, 2,000° C.), thereby causing deterioration thereof. A pertinent solution to this problem is therefore also necessary.

This invention now solves these three problems and covers an improved screen substantially characterized in that it mainly consists of a supple material of the layer, mat, fiber network type, usable as a support or reinforcement for a pulverulent material capable of absorbing and retaining a liquid to produce a paste or a gel having a high thixotropic efficiency, such screen; which is hereinafter called a hydrator-overheater element or layer evolving in the presence of said liquid from the hydrating function to the overheating function depending on the development of the thermal aggression.

According to further characteristics of this invention:

The hydrator-overheater element is disposed sandwiched between two supple coating elements, with one in intimate contact with the face, i.e. external or exterior surface, of the element to be protected and the other constituting the external face of the finished screen.

The supple or flexible elements of the coating consist of polymeric, e.g. elastomeric, materials reinforced with fiber materials, or not.

The supple element constituting the outer face of the finished screen contains such a material giving endothermal reaction with the vaporized and overheated liquid from the hydrator-overheater.

Among examples of materials for realizing the screen according to the invention there can be cited the following:

colloidal silica as the pulverulent material intended for absorbing and retaining a liquid to produce an inorganic paste or a gel having a high thixotropic efficiency;

fibers, webs, tissues of refractory fibers such as rocks, ceramics and the like as the supple material of the layer, mat, fiber network type;

any elastomers and more particularly, silicone elastomers reinforced or not with fibers, webs or tissues of refractory materials and the like, as the supple elements of coating, and finally, carbon as the material giving an endothermal reaction with the vaporized liquid from the hydrator-overheater layer.

It is known actually that carbon produces with water at high temperature the so called well known reaction of fabrication of water-gas, strongly endothermal. The significance and interest of such endothermal reaction for the protection against aggression from very high thermal fluxes will be explained hereinafter.

Other characteristics and advantages of the invention will appear more clearly from the following description, which is made in the light of the attached drawing which is a schematic view of a screen according to the invention, mounted to the wall of an element to be protected.

With reference to the drawing, there is shown in a schematic cross-sectional view the element to be protected 1 onto the exterior surface of which a coating layer 2 is applied by any means known in itself such as glueing, covering or the like; the coating layer is itself used as a support for the hydrator-overheating layer 3, which is advantageously constituted by a supple fibrous reinforcement impregnated with an inorganic paste or a gel based on a high thixotropic efficiency substance, and on a liquid having a vaporization temperature depending on the temperature at which the element to be protected must be kept, or by a supple fiber reinforcement within which there is the most uniformly distributed said substance in the pulverulent state, which is intended for producing said gel having a high thixotropic efficiency with said liquid of a given temperature of vaporization.

The hydrator-overheater layer 3 is itself coated with a covering layer 4 of a structure or constitution that may be identical or different as compared to those of layer 2.

Layers 2 and 4 advantageously consist of an elastomer, for example, of the silicone elastomer type, reinforced or not with refractory fibers in form of mats, felts or tissues, of a refractory material, of quartz or the like. These layers are applied by glueing or else by any appropriate means on the respective underlying elements 1 and 3 used as supports thereof. In view of the nature and suppleness of the constitutive elements of the so realized screen according to the invention, it may exactly follow the contours of the elements to be protected with minimum bulk, a significant protective efficiency being obtained with a minimum thickness as will be apparent from the examples hereinafter.

Starting from the case in which the hydrator-overheater element 3 is based on an aqueous gel of colloidal silica, the phenomenon occurring with the screen of the invention is the following:

When the outer face of the upper and exterior element 4 is submitted to aggression from an intense thermal flux (temperature that may reach 1100° C.), and the assembly is at a pressure of 1 bar, such thermal flux upon reaching the hydrator-overheater element 3 causes at the given pressure vaporization of the liquid contained within said element (i.e. water in the case of the selected example) followed by overheating of the vapour so produced, which then evacuates the maximum of calories through the element 4 which became porous under the effect of said thermal aggression.

Thus, during the complete process of vaporization with overheating, the overheating of the vapour causes increased enthalpy which is given by the difference of the stabilized temperature of the vapour at the cool wall and the maximum temperature of said vapour on exiting the thermal protection. For this reason, it will be easily understood that the more intense the thermal aggression flux, the greater the quantity of calories evacuated by the active material. Moreover, there is obtained an efficient thermal protection in which the lowest temperature does not exceed the vaporization temperature of the liquid included in the hydrator-overheater element, this temperature being, for all the duration of such vaporization, 100° C., in the example of water, at the atmospheric pressure of 1 bar, and for a duration directly proportional to the quantity of such water included in said hydrator overheater layer, whatever be the thermal aggression.

It may be immediately noted that the lowest protection temperature can be defined by the vaporization temperature of the liquid included in the hydrator and/or the pressure to which said hydrator is submitted. In other words, the liquid included in the hydrator has a vaporization temperature at the pressure of the environment which is equal to that corresponding to the desired protection temperature of the substrate, and it is at this pressure of the environment that the liquid vaporizes when the hydrator-overheater element 3 is subjected to flame or intense temperature.

Thus, still taking water as the liquid included in the hydrator, it is known, for example, that such water vaporizes at about 17° C. under 0.02 bar and that for this reason, the protection temperature that might be obtained would lie between 17° C. and 100° C. for a pressure variation of about 0.02 to 1 bar, whereas the aggression by the thermal flux would still be in the order of 1100° C., and more.

An interesting feature of this invention therefore appears for the airspace domain (entrance into the atmosphere of a space vehicle with pressure variation of 0.02 to 1 bar).

Apart from the nature of the liquid included in the hydrator, which defines in this way various ranges of protection temperatures, the quantity of such liquid defines the duration of protection.

However, in view of the constitution itself of the hydrator the liquid reloading of the latter can be calculated, the substance composing it being strongly avid for liquid and forming therewith a high thixotropic efficiency gel.

Thus, the screen according to the invention may comprise in the starting condition either a gel which is a component of the already constituted hydrator-overheater mixture and (referring to the portion of the FIGURE in dot-dash lines), a conduit for supplying liquid 5 coming from a source 7, with a circulation pump 6 automatically controlled as a function of the quantity of escaped liquid, and/or of the temperature, or the substance intended to produce said gel at the time of use, such substance being distributed in the pulverulent state on its support (e.g. pulverulent silica) and the same circuit for supplying liquid. Such a realization permits to remedy and compensate for at any time any liquid losses that may happen during a thermal aggression which would be of a lesser importance but would anyhow lead to vaporization of the liquid included in the hydrator-overheater. Furthermore, the dissipation of calories can be still be increased by selecting as the coating material 4 an elastomer material which necessarily becomes porous at high temperatures and moreover, capable of expanding thereby facilitating dissipation.

According to an alternative embodiment, the sealing element 4 may advantageously comprise in its formulation and realization a substance or formulation based on carbon, which in the specific case of water vapour produces a strongly endothermal reaction (reaction of gas with water) thereby driving off the calories to be eliminated.

The following examples are given in an illustrative not limitative way to show the results which can be obtained with a screen made in accordance with the invention.

Such results were collected after tests consisting of submitting a sample comprising the thermal protection element according to the invention to a thermal flux simulating a fire by hydrocarbon by disposing the samples at one meter above the flame bed (about 900° C.), and disposing thermocouples uniformly distributed between the outer skin and the protection in such a way as to be able to detect the temperatures at various points of the sample during the experiment.

EXAMPLE 1

Protections of tanks

Test on a container of a 650 mm diameter

Definition of the sample

Support: coiled capacitor of glass-epoxy resin of 650 mm diameter and 1 m length
Protection: thickness: 25 mm, total mass of the thermal protection: 101 kg.
Seven thermocouples are disposed and uniformly distributed between the outer skin of the capacitor and the thermal protection.

Results of the test

Stabilisation of the seven points of measurement of temperature on a container at 100° C.±10° C., after two hours of exposure
Flat level of four hours at 100° C.±10° C.
The hottest point reaches 110° C. after 6 hours of exposure to the thermal flux. To this end, 1400 liters of fuel have been used.

It is to be noted that under these test conditions the best materials presently known ensure with an equal thickness a protection in the order of one hour, which would be the case with the same thickness with a screen made according to the earlier U.S. Pat. No. 2,061,509.

EXAMPLE 2

Mechanical protection of constructional materials

Test on two safety fire-proof gangways on an off-shore platform

Material used

The material used is identical to that of the test on containers.

However, the gangways disposed at one meter above the flame bed (distance between supports: 1 m) are moreover submitted to a force of 500 daN (for simulating the passage of a rescuer carrying a victim) applied to the center of each gangway on an area of 300×300 mm.

Definition of the samples

Support: lightweight alloy grating
    (type I: without perforations)
    (type II: with perforations)
Dimensions: 1080×300 mm-thickness: 25 mm.
Protection: filling up the alveolates of the grating by employing the invention (no protection on the upper surface of the gangways)
Mass of the samples:
    Type I: 14.215 kg
    Type II: 13.545 kg.

Results of the test

Measurement of temperature on the unprotected face of the samples:
    After one hour of exposure:
        type I=115° C.
        type II=150° C.
    After one and half hours of exposure:
        type I: 140° C.
        type II: 200° C.
    Measurement of the increase of the sag in the center of the samples after one and half hours of exposure to the flux:
        type I: 4 mm
        type II: 9 mm,
    i.e. at the end of the test, a total sag of:
        14 mm for type I
        19 mm for type II.
The critical sag indicated for those samples is 22 mm.
For comparison purposes, such gratings have been tested under the same conditions:
    without thermal protection: collapsing after 6 min.exposure
    with a thermal protection based on rock wool: collapsing after 12 min.exposure.
The above results bring about the following conclusions:

The screen according to the invention, due to its properties enabling stabilisation of the temperature at about the temperature of vaporization of the liquid included in the hydrator-overheater (100° C. in the case of water) and the duration of its efficiency, proves to be largely superior to any other insulating coatings presently used. Moreover, due its structure and constitution it is possible to load or reload it as desired with liquid to be vaporized so that the required or sufficient quantity is always available.

In view of such results, the possibilities of application are very significant and extensive: domain of airspace, petrochemistry, and generally, any sector for which the problem of fighting against fire or aggression from intense thermal fluxes still comes up now in a crucial manner.

Moreover, those materials which are presently banned for the realization, construction or manufacturing of assemblies or assembly components when there is a risk of fire might be used in combination with a protection realized according to the invention, such as for example, the utilization of glass-resin composites on off-shore drilling platforms.

It will be understood that this invention was only described in a purely explanatory not limitative manner and that any useful modification thereof may be effected without departing from its scope.

I claim:

1. A thermal dissipation screen applied to the external surface of a substrate to protect said substrate from high temperatures, said screen comprising
    a bottom layer for directly covering the exterior surface of the substrate to be protected, said bottom layer comprising a polymeric material optionally reinforced with fibrous material;
    a supple hydrator-overheater layer overlaying said bottom layer, said hydrator-overheater layer comprising a refractory fibrous network, a pulverulent inorganic material capable of absorbing and retaining a liquid to produce a paste or a gel of a high thixotropic efficiency, and a liquid having a vaporization temperature at the pressure of the environment equal to that corresponding to the desired protection temperature of the substrate; and
    a flexible upper and exterior layer covering said hydrator-overheater layer, said flexible upper layer comprising a polymeric material which becomes porous at temperatures higher than said vaporization temperature, said upper and exterior layer constituting means permitting said liquid to vaporize at the pressure of the environment.

2. A thermal dissipation screen according to claim 1, wherein at least one of said bottom layer and said flexible upper and exterior layer is formed of an elastomeric material.

3. A thermal dissipation screen according to claim 2, wherein said flexible upper and exterior layer comprises a filler capable of producing an endothermal reaction with vaporized and overheated liquid escaping from said hydrator-overheater layer upon development of thermal aggression.

4. A thermal dissipation screen according to claim 3, wherein said refractory material comprises refractory fibers, said pulverulent inorganic material comprises colloidal silica; said liquid is water; and said filler to produce an endothermal reaction comprises carbon.

5. A thermal dissipation screen according to claim 1, wherein said flexible upper and exterior layer further comprises a supple refractory material.

6. A thermal dissipation screen according to claim 5, wherein said supple refractory material of said flexible upper and exterior layer comprises refractory fiber reinforcing material.

7. A thermal dissipation screen according to claim 1, wherein said flexible upper and exterior layer contains a material to produce an endothermal reaction with the vaporized and overheated liquid from the hydrator-overheater layer.

8. A thermal dissipation screen according to claim 1, wherein said pulverulent inorganic material and said liquid together comprise silica gel.

9. A thermal dissipation screen according to claim 7, wherein said material to produce an endothermal reaction with the vaporized and overheated liquid is carbon.

10. A thermal dissipation screen according to claim 1, further comprising means to supply said liquid to said hydrator-overheater layer during a thermal aggression.

11. A thermal dissipation screen according to claim 2, wherein said elastomeric material comprises a silicone resin.

* * * * *